May 9, 1939.  G. W. WALTON  2,157,468

TELEVISION SCANNING SYSTEM

Filed April 15, 1936

Inventor,
George W. Walton.
By Cushman Darby & Cushman
Attorneys

Patented May 9, 1939

2,157,468

UNITED STATES PATENT OFFICE 2,157,468

TELEVISION SCANNING SYSTEM

George William Walton, Kensington, London, England

Application April 15, 1936, Serial No. 74,569
In Great Britain April 25, 1935

6 Claims. (Cl. 178—7.6)

The present invention relates to television scanning apparatus in which the scanning is accomplished by two moving members.

It is well known in television to have two moving members, one of which accomplishes the low-speed scanning, generally known as the picture frequency scanning, the other of which accomplishes the high-speed scanning, that is to say, the scanning along the picture strips. These members can be two polygon mirrors rotating on axes at right angles to one another, two independently vibrating mirrors, or combinations of oscillating and rotating members.

One object of the invention is to reduce the size of these moving members, and a further object is to increase the optical efficiency of the apparatus.

It has been previously proposed to use an optical system in television which focusses in two separate and distinct planes imperfect images of an object, picture, or image. In other words in one plane is formed a cylindrical image having definition in one direction, and in the other plane is formed a second cylindrical image having definition in a direction which is at an angle (preferably a right angle) to the direction of definition of the image in the first plane.

The present invention combines an optical system of this type with two scanning members in such a way that a cylindrical image of a light source is formed at or near the optical surface of the high speed scanning member, the direction of definition of the image being at right angles to the direction of movement of the member, and a second cylindrical image of the light source is formed in some other plane, the direction of definition of this image being at right angles to that of the first image, and a complete image of the light source is focussed on the surface to be scanned from these two cylindrical images.

If desired the plane in which the second cylindrical image is formed can be coincident with the surface to be scanned, in which case it is only necessary to focus, on the surface to be scanned an image of the surface of the high speed scanning member.

Figure 1:
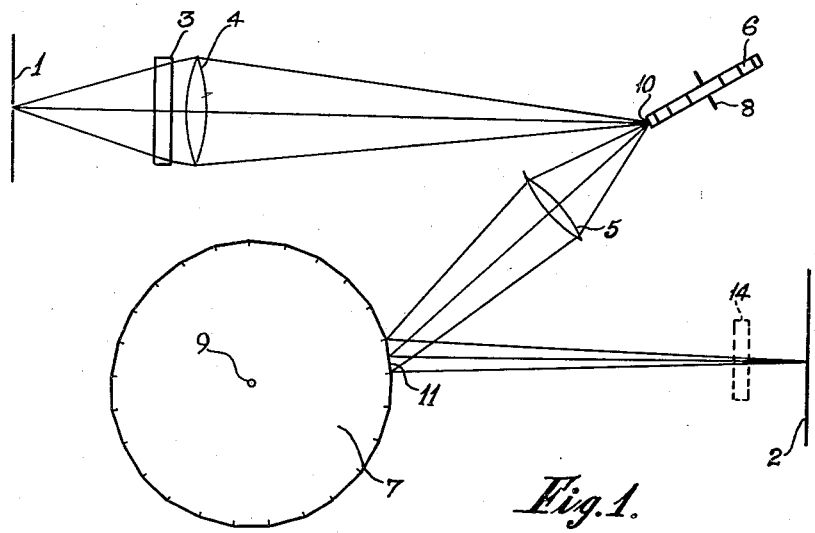
Figure 2:
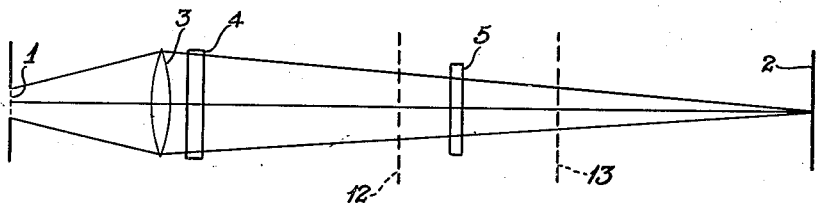
Figure 3:
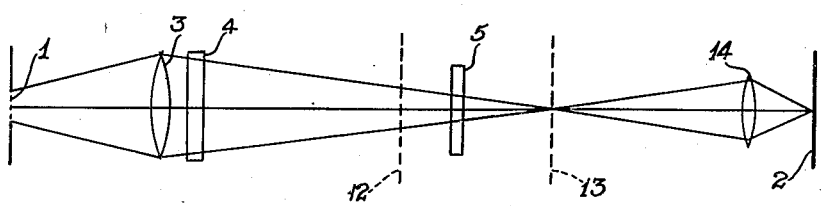

In order to render clearer the nature of the invention, a practical embodiment will be described by way of example with reference to the accompanying drawing in which Fig. 1 shows a side elevation of the complete scanning system, and Figs. 2 and 3 illustrate diagrammatically the action of the optical system in plane at right angles to that of Fig. 1.

Referring to the drawing, an image of a light source in the form of an illuminated slit 1 is formed upon the surface 2 to be scanned, by means of an optical system comprising the cylindrical lenses 3, 4 and 5, and this image is swept over the surface 2 by means of the rotating polygon mirror drums 6 and 7. The drum 6 rotates about the axis 8 and provides the high speed scanning component, and the drum 7 rotates about the axis 9 and provides the low speed scanning component.

In the plane of Fig. 1 the lens 3 has no power, whilst the lens 4 has such power that it forms a cylindrical image of the slit 1 on the reflecting surface 10 of the mirror drum 6. The diverging beam reflected from this surface is focussed by the lens 5, which has power in this plane, so that a cylindrical image of the surface 10 of the drum 6 is formed, after reflection of the beam from the surface 11 of the mirror drum 7, on the surface 2.

The action of the optical system in the plane at right angles to that of Fig. 1 is illustrated in Fig. 2. In order to simplify matters the path of the light beam from the slit 1 to the surface 2 has been straightened out, and the positions at which reflection from the surfaces 10 and 11 takes place is indicated by the dotted lines 12 and 13 respectively. In this plane, the lens 3 is the only one which possesses focussing power and it is adapted to focus a cylindrical image of the slit 1 on the surface 2.

Thus two cylindrical images of the slit 1 are formed, one in a plane intersecting the surface 10 and having definition in a direction at right angles to that in which this surface moves, and the other in the plane of the surface 2 and having definition in a direction at right angles to the direction of definition of the first image. Also the image formed at the surface 2 will be a two-dimensional image since in one plane it is focussed from the surface 10 and in a perpendicular plane it is focussed from the slit 1. Owing to the fact that the light from the slit is focussed on the surface 10 in the plane of Fig. 1, the size of the mirrors of the high-speed mirror-drum 6 can be very greatly reduced in the direction perpendicular to their direction of movement without in any way decreasing quantity of light handled by the mirror drum. Thus its optical efficiency is greatly increased and its weight is reduced.

An alternative arrangement will now be described with reference to Figs. 1 and 3. In the plane of Fig. 1 the arrangement is exactly similar to that of the previously described example, the addition of the cylindrical lens 14 having no effect in this plane, since it has no focussing power in this plane. In the perpendicular plane, the action is somewhat different, as shown in Fig. 3. The lens 3 focusses a cylindrical image of the slit 1 on the surface 11 of the mirrors of the low speed mirror drums, the position of which is indicated by the dotted line 13. The cylindrical lens 14 forms a cylindrical image of this surface on the screen 2. Thus two cylindrical images of the slit 1 are formed at the surfaces of the high and low speed mirror drums respectively, and the two-dimensional image on the surface 2 is focussed from these two images. With this arrangement some reduction in the size of the mirrors of the low speed mirror drum 7 in a direction perpendicular to the direction of motion is possible, but the degree of reduction possible is less than in the case of the high speed mirror drum 6, since mirrors of the mirror drum 7 must always be wide enough to accommodate the transverse motion of the light beam produced by the mirror drum 6.

It is clear that the same advantages will result from applying the invention to a scanning system employing oscillating mirrors in place of the mirror drums, exactly the same method of applying the invention being employed.

The scanning system can be employed either in a transmitter or a receiver. In the former case the slit 1 is illuminated with light from a constant source, and the surface 2 comprises the object, picture or image which is to be transmitted. In the latter case, the slit 1 is illuminated with light which is modulated with the incoming picture signals, and the surface 2 constitutes the receiving screen.

I claim as my invention:

1. A television scanning system comprising a first scanning member, a second scanning member, each of said scanning members being mounted to move angularly about an axis, an optical system having different optical powers in two mutually perpendicular directions and adapted to focus two images of a light source in two separate planes, with each image having definition in one dimension only and with one of the planes at the optical surface of said first scanning member, and means for forming from said two cylindrical images a two-dimensional image of the light source on a surface to be scanned.

2. A television scanning system according to claim 1 wherein the other of the two images formed by said optical system is formed at the surface to be scanned.

3. A television scanning system according to claim 1 wherein the other of the two images formed by said optical system is formed at the optical surface of said second scanning member.

4. A television scanning system comprising a high-speed mirror drum, an optical system having different optical powers in two mutually perpendicular directions and adapted to form an image of a light source on the optical surface of said high-speed drum, which image will have definition only in a direction perpendicular to the direction of movement of said high-speed drum, said optical system also being arranged and adapted to form a second image of the light source on the surface to be scanned, which image has definition only in a direction perpendicular to the direction of definition of the first image, and a second optical system adapted to form an image of the optical surface of said high-speed drum on the surface to be scanned and which image will have definition only in a direction perpendicular to the direction of definition of the second image of the light source.

5. A television scanning system comprising a high-speed mirror drum, a low-speed mirror drum, an optical system having different optical powers in two mutually perpendicular directions and adapted to form one image of the light source on the optical surface of said high-speed drum and a second image of the light source on the optical surface of said low-speed drum, each of these images to have definition in one direction only and with the directions of definition mutually perpendicular, a cylindrical lens adapted to form an image of the optical surface of said high-speed drum on the surface to be scanned, and a second cylindrical lens adapted to form an image of the optical surface of said low-speed drum on the surface to be scanned, said images having definition in mutually perpendicular directions and together constituting a two-dimensional image of the light source.

6. A television scanning system comprising a high-speed scanning member, a low-speed scanning member, each of said scanning members being mounted for movement angularly about an axis, a light source, an optical system situated between said light source and said high speed scanning member and having different optical powers in two mutually perpendicular directions, said optical system being adapted to form a first line image of the light source substantially on the surface of said high speed scanning member, the longer dimension of the first line image lying in the plane containing the direction of motion of said high-speed scanning member, and a second line image of said light source at a point distant from said high-speed scanning member, the longer dimension of the second line image being at right angles to the longer dimension of the first line image, and a second optical system situated between said high speed scanning member and the surface to be scanned and having different optical power in two mutually perpendicular directions, said second optical system being adapted to form two further line images having their longer dimensions mutually perpendicular on said surface, one of the further line images being an image of said surface of the high-speed scanning member.

GEORGE WILLIAM WALTON.